Patented Aug. 30, 1932

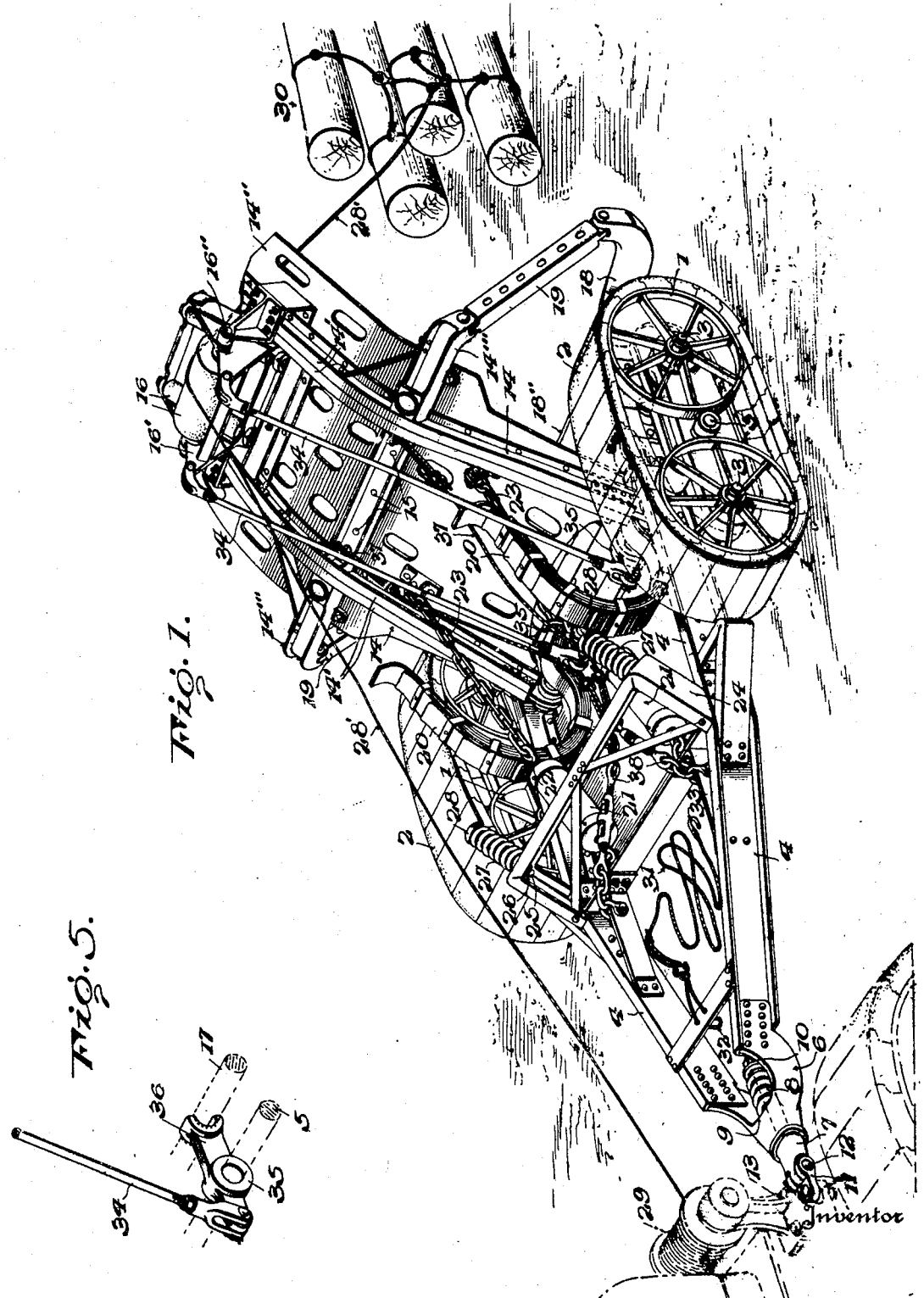

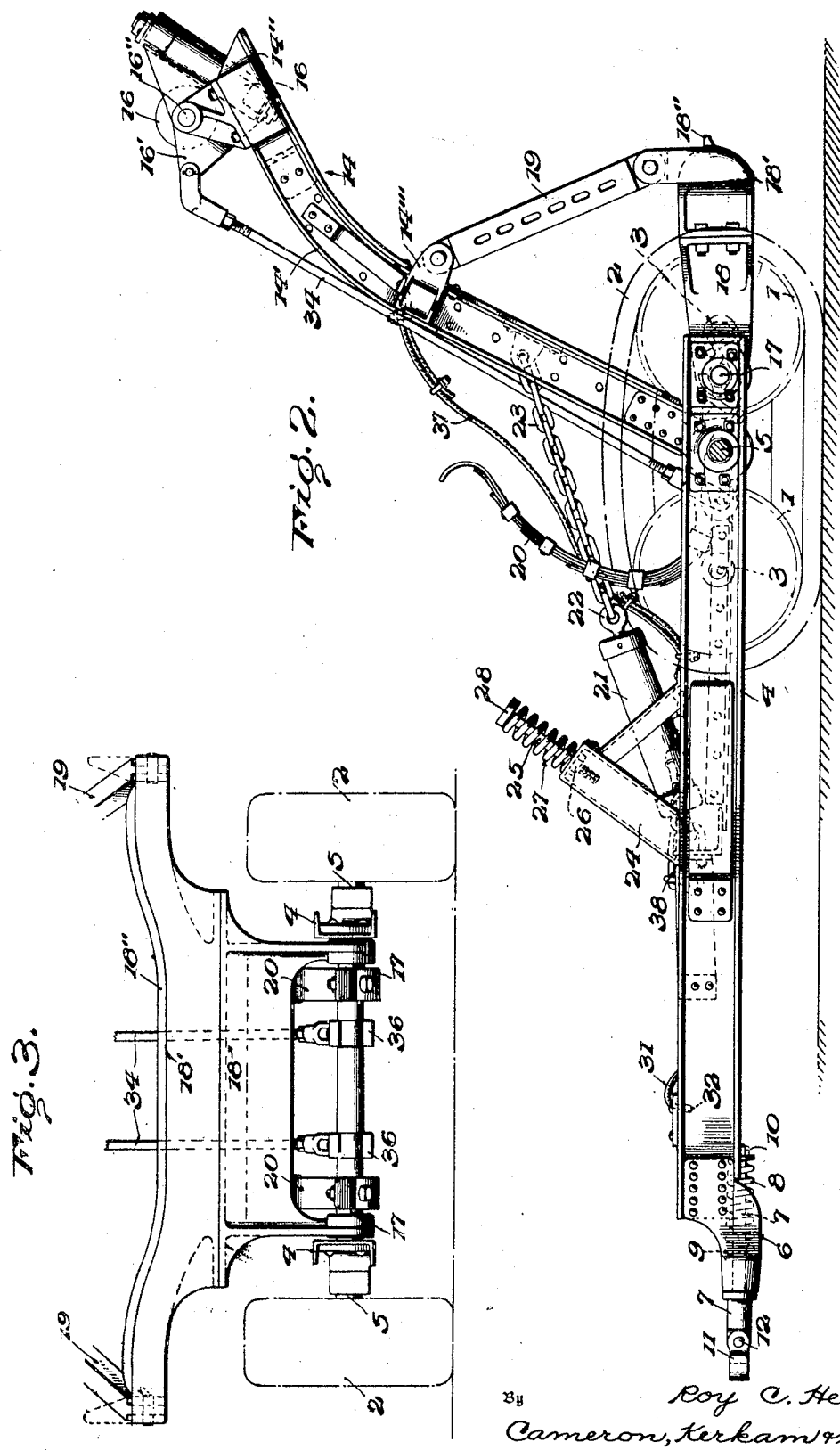

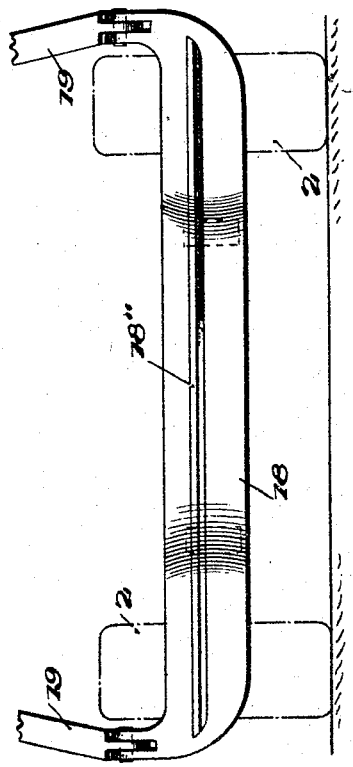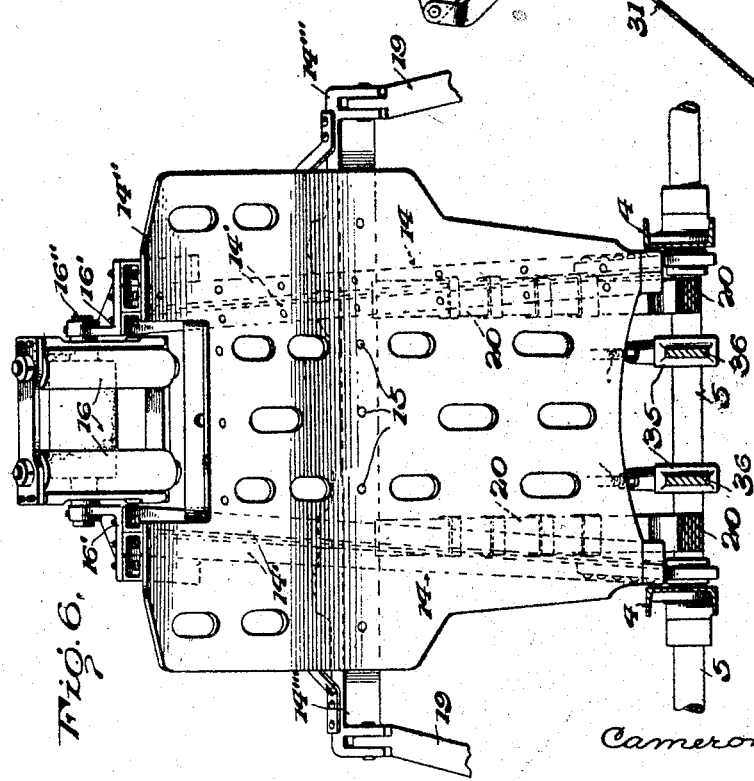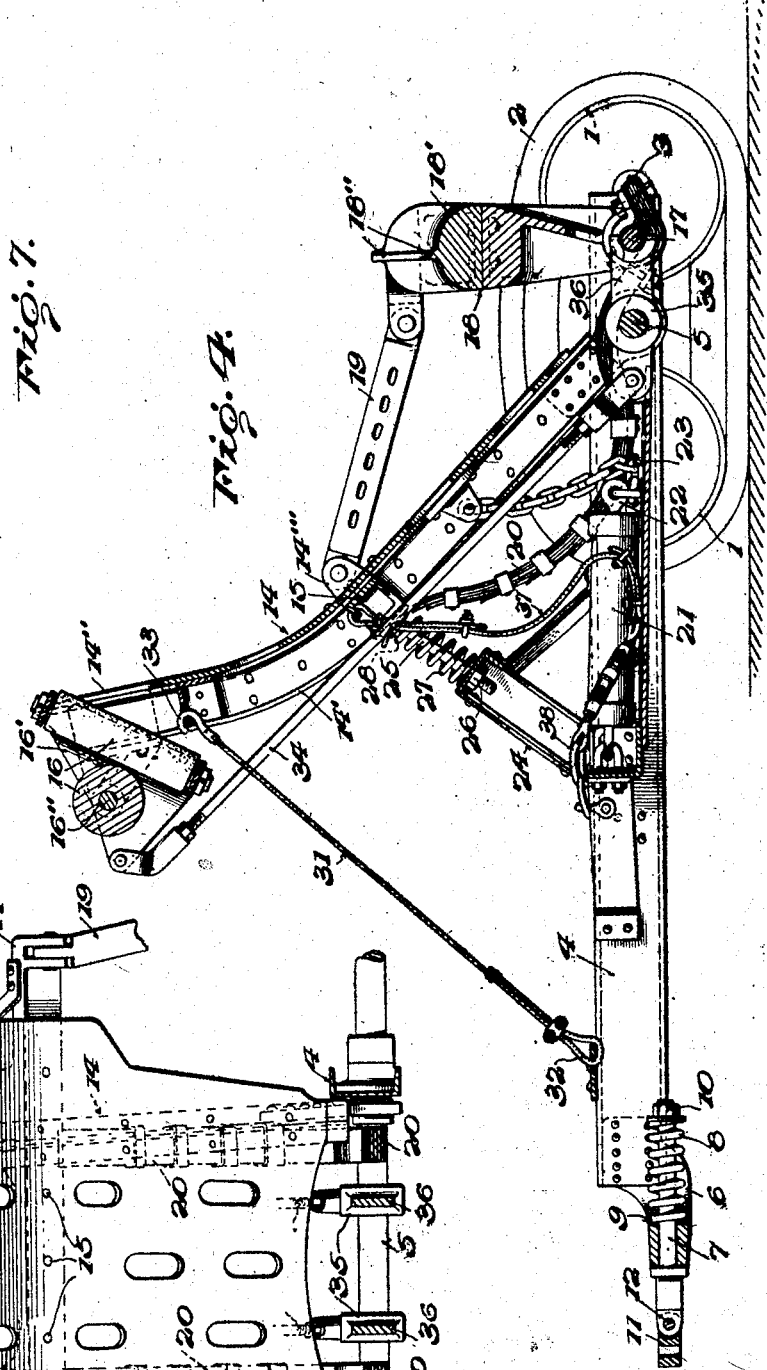

1,874,007

UNITED STATES PATENT OFFICE

ROY C. HEATON, OF TACOMA, WASHINGTON, ASSIGNOR TO TRACTOR PARTS COMPANY, OF SEATTLE, WASHINGTON, A CORPORATION OF WASHINGTON

LOADING AND TRANSPORTING DEVICE

Application filed June 8, 1931. Serial No. 542,928.

This invention relates to apparatus for loading, transporting and unloading heavy objects, particularly logs and the like, and has for its object to provide an improved apparatus of this character whereby logs or the like may be easily lifted and their ends placed on a suitable support, hauled to their desired destination, and readily and speedily unloaded.

As heretofore constructed apparatus of this character consists of a wheel-supported swinging arm or standard equipped with a running cable for elevating the logs, together with a wheel-supported load support, said standard and load support being connected for swinging movement about their axes. After the logs have been elevated and the standard swung about its axis, together with the load support, the logs are lowered onto the latter, these operations being preferably accomplished by hauling in the cable.

Difficulty has been encountered in unloading such structures and it has been found necessary to hitch a cable to a suitable abutment and to the swinging standard or load support and apply power to the cable to make it unload; furthermore, when travelling empty over rough ground, the standard and load support are frequently swung violently to loading position with resulting damage to the parts. One object of the present invention is to provide means for automatically unloading the logs while at the same time preventing the violent swinging of the loading standard to loading position when the apparatus is being moved empty over rough ground. A further object is to provide yielding means for receiving or supporting the standards in loaded position, said means preferably assisting in returning the parts to unloading position when the apparatus is to be unloaded or to loading position, the loading and unloading position of the parts being in fact the same. A further object is to so construct the device that it may be so connected to the power apparatus for moving the same that it will more readily clear stumps and other ground obstructions.

With these objects in view the invention consists in the construction and combination of parts hereinafter more specifically described and then pointed out in the claims. The inventive ideas constituting the improvements herein claimed are capable of receiving a variety of mechanical expressions, one of which for the purpose of illustrating the invention is shown in the accompanying drawings, but it is to be expressly understood that these drawings are for the purpose of illustration only, and are not designed to define the limits of the invention, reference being made to the appended claims for this purpose.

In said drawings:

Fig. 1 is a perspective view of the apparatus in the act of loading logs thereon;

Fig. 2 is a side elevation;

Fig. 3 is an elevational rear view of the load supporting bunk, the other parts of the machine being broken away;

Fig. 4 is a side elevation of the vehicle with the parts in loaded position;

Fig. 5 is a broken detail;

Fig. 6 is a rear elevational view of the standard with parts broken away, and

Fig. 7 is a rear elevational view of the load supporting bunk.

Referring to the drawings, in which like reference numerals indicate like parts throughout the several views, 1 indicates ground wheels provided with a flexible track 2, which wheels are mounted on suitable axles 3 carried by a frame 4, the members 4 of which frame are connected by an axle 5. These frame members 4, 4, converge at the front, as shown in Fig. 1, forming a tongue, which at the extreme forward end has a depending portion 6 through which extends headed pin 7, surrounded by a spring 8 reacting between a shoulder 9 and the head 10 of the pin 7. The pin 7 extends from front to rear on a line just below the lower line of the members of the frame 4, and is free to turn in its bearing, as will be readily understood. At its forward end the pin has connected thereto a coupling socket 11 through the medium of the horizontal pivot 12. The vehicle is connected to any suitable tractor diagramatically shown at 13. Instead of a wheel support of the track laying type, it is to be understood that any suitable wheel support for the frame 4 may be employed. Pivoted on the axle 5 is a standard 14, here shown as composed of two wrought iron elements 14', 14', connected by an apron 14''. Extending through the elements 14', 14' is a cross element 14''' and the apron 14'' is connected, as by rivets 15, to said cross element and to the elements 14', 14'. The outer ends of the cross element 14''' are bent rearward (and downward when the device is in loading position as shown in Fig. 1). Mounted upon the extreme upper end of the standard 14, and between the elements 14', is any suitable fairlead 16, here shown as composed of two vertical and one horizontal rollers, but it will be understood that such form of fairlead is merely illustrative, and that the invention is not limited to the particular form of fairlead employed.

Mounted on a transverse axis 17, to the rear of the axle 5, is a load supporting bunk 18, which is preferably of cast steel, and as shown at 18' in Fig. 4, is preferably oval in cross section and provided with a ridge 18'' which extends from one end of the load supporting bunk to the other end thereof. This load supporting bunk 18 is preferably, though not necessarily, depressed in its central portion as shown in Fig. 3, and is free to swing about its axis composed of the stub shafts 17, 17 mounted in the frame 4. On its forward side (when the parts are in the loaded position, Fig. 4) the load supporting bunk 18 is connected by means of links 19, one on either side, to the ends of the cross element 14''', the position of said cross member 14''' being such that when the parts are in their loaded position, Fig. 4, the ends of the links, where they are connected to the cross member 14''', are in a plane above the load supporting bunk 18.

Shackled at their lower rear ends to the stub shaft 17, 17 are two stiff, powerful springs 20, which springs are bent upward and over the axle 5, as clearly shown in Fig. 4, and then somewhat downward and forward, and then extend in an upward and somewhat rearwardly inclined direction (when the parts are in loading position, Fig. 2) in front of the standard 14. These two springs 20 are preferably positioned so that they come immediately opposite the elements 14', to the end that when the standard 14 is swung forward on its pivot 5 to the position shown in Fig. 4, these springs receive the standard and are flexed thereby in a forward direction. These springs are preferably powerful enough to swing the entire standard 14 and the parts connected therewith from the loaded position shown in Fig. 4 to a point just past the vertical position, to the end that gravity may continue the movement and swing the standard 14 to its loading (or unloaded) position shown in Fig. 2.

Pivoted at its lower end to a cross member between the sides of the frame 4, 4, is a cylindrical casing 21, within which is any suitable spring surrounding a headed pin, whose projecting end is provided with an eye 22, and a chain 23 extends from said eye to the frame 14. The rearward movement of the standard 14, as it moves to loading position is yieldingly checked by the spring in the cylinder 21, thus preventing injury to the parts.

Suitably mounted between the sides of the frame 4 is an inverted U member 24 from which extend headed pins 25, Figs. 2 and 4, having nuts 26 screw threaded thereon and springs 27 surround the pins 25 and react between the upper surface of the U member 24 and the heads 28 of the pins. The position of these springs is such as to receive in the cupped ends of the cross elements 14''' when thrown to its full loaded position shown in Fig. 4, and by their cushioning effect prevent injury to the parts as they come to rest in this position.

A suitable cable 28', Fig. 1, extends from any suitable winch 29, on a tractor, through the fairlead 16, and at the extreme rear end may be attached to a load, as for example the logs 30. When the cable is wound up and the logs raised, the standard 14 and the bunk 18 swing into the position shown in Fig. 4, and when the cable 28 is made fast, the loading is complete and the forward end of the logs rest upon the bunk 18.

The tendency of the springs 20 would be to throw the standard 14 from its forward position, shown in Fig. 4, to its rearward or unloading position, Fig. 2, and in order to hold the parts in the position shown in Fig. 4, that is, in loaded position the unwinding of the cable from the winch 29 is prevented by the application of any suitable hand brake (not shown) to the winch. This will hold the parts in loaded position, and when it is desired to unload, it is only necessary to release the brake on the winch and to drive the machine forward when the standard and load bunk will swing to unloaded position. For the purpose of holding parts in the forward position shown in Fig. 4, even when the machine is not loaded (as for example when it is travelling from place to place), there is preferably provided a cable 31 firmly fixed at its lower end 32 to the frame, as shown in Fig. 4, and provided at its other end with a hook 33 for engaging a part of the standard and thus holding the parts in the forward position, shown in Fig. 4, against the tension of the springs 20. When the form of fairlead 16 is that shown, the side and bottom rolls constituting said fairlead are preferably mounted in a frame 16', rocking on a pivot 16''. This frame 16' has attached thereto a pair of rods 34, the lower ends of which rods are connected (as shown in Fig. 5), to a sleeve 35 surrounding the shaft 5 which sleeve has a part 36 extending rearward and partially embracing the stub shaft 17. By this construction, as the standard is swung from the loading position, shown in Fig. 1, to its loaded position, shown in Fig. 4, the fairlead is automatically turned to retain it in the proper position to guide or lead the cable 28'.

In order to prevent undue strain on the cylinders 21, pins 22 and chains 23, in the act of elevating the logs to place them on the load supporting bunk, a pair of cables 37 are secured to the standard (Figs. 1 and 2) and at their lower ends to turn buckles and chains 38 attached to the frame in front of the standard.

It will be seen that when the vehicle reaches its destination and it is desired to unload it, all that is necessary is to release the brake on winch 29 and slacken on the cable 28', when the springs 20 will automatically throw the standard 14 from the position shown in Fig. 4 to that shown in Fig. 2; and that, by reason of the connection of the standard with the load supporting bunk through the link 19, the bunk will swing to its lowermost and practically horizontal position shown in Fig. 2. Furthermore, the termination of this rearward swing of the standard will be checked by the buffer spring in the cylinder 21, thus avoiding damage of the parts. Moreover, when the standard is swung into position, shown in Fig. 4, that is, its fully loaded position, the load supporting bunk will be substantially vertical, and that, as the standard comes to rest in its forward position, it will be received by the buffer springs 27. Furthermore, when moving the vehicle, empty, from one point to another, the parts can be swung into the position shown in Fig. 4, the retaining cable 31 applied, and the parts thus held against movement and without damage to the parts. It will also be seen that, by reason of placing the coupling pin 7 on a line below that of the bottom of the frame members 4, said members will be elevated at the forward ends, thus avoiding injurious contact with stumps, stones or the like in passing over rough ground in operations.

What is claimed is:

1. In an apparatus of the class described, a vehicle, a swinging standard mounted on said vehicle and having a swinging running support for a cable, a cable passing over said support, means for hauling in said cable to lift a load to be transported and to swing said standard to loaded position, automatic means swinging said cable support during the swinging of said standard, resilient means opposing said standard as it moves to loaded position, a swinging load support, and operative connections between said standard and said load support, to move the latter to load supporting position.

2. In an apparatus of the class described, a vehicle, a swinging standard mounted on said vehicle, a swinging frame on said standard, a running support for a cable carried by said frame, a cable passing over said support, means for hauling in said cable to lift a load to be transported and to swing said standard to loaded position, means opposing said standard as it moves to loaded position and tending to move it to unloading position, a rod connected to said frame and said vehicle to swing said frame during the swinging movements of said standards, a swinging load support, and operative connections between said standard and said load support, to move the latter to load supporting position.

3. Apparatus of the class described, comprising a vehicle, a standard pivoted to a horizontal axis thereon, a load support pivoted on a horizontal axis to the rear of the axis of the standard, connections between said standard and support whereby they swing simultaneously on their axes, a spring secured at one end to the load support axis and passing over the axis of the standard and into the path of the latter in its forward movement, and means swinging said standard forward from loading to loaded position.

4. An apparatus as described, comprising a vehicle, a load supporting bunk mounted on an axis transverse to said vehicle, said bunk having a top oval in cross section with a ridge extending lengthwise of the bunk, and means swinging said bunk on its axis and depositing a load thereon.

5. An apparatus as described, comprising a vehicle, a load supporting bunk mounted on an axis transverse to said vehicle, said bunk being concave in a direction transverse to said vehicle and having a top oval in a cross section longitudinally of said vehicle, and means swinging said bunk on its axis and depositing a load thereon.

6. An apparatus as described, comprising a vehicle, a standard on said vehicle mounted to swing in a vertical plane from loading to loaded position and vice versa, power means swinging said standard to loaded position, means securing said standard in loaded position, and means moving said standard from loaded to loading position when said securing means are released.

7. In an apparatus of the class described, the combination of a vehicle, a frame carried by said vehicle, a standard composed of two rearwardly curved bars mounted on said frame to swing on a horizontal axis, a cross bar connecting said curved bars, a cable passing over a cable support on said bars, means for hauling in said cable to lift a load to be transported and to swing said standard to loaded position, a pair of reversely curved blade springs receiving said curved bars as the standard moves to loaded position, a swinging load support, and operative connections between said cross bar and said load support to move the latter to load supporting position.

8. In an apparatus of the class described, the combination of a vehicle, a frame carried by said vehicle, a standard composed of two rearwardly curved bars mounted on said frame to swing on a horizontal axis, a cross bar connecting said curved bars, a cable passing over a cable support on said bars, means for hauling in said cable to swing said standard forward on said frame, a pair of reversely curved blade springs receiving said curved bars and placed under tension thereby, and means retaining said standard in said forward position against the tension of said springs.

9. In a device of the character described, the combination of a standard mounted to swing in a fore and aft plane, a reversely curved blade spring receiving said standard when swung to its forward position, a swinging load support to the rear of said standard, and a link connection pivoted to said support and standard, the point of connection to said standard when the same is in its forward position being in a plane above the point of connection to said support.

10. In a device of the character described, the combination of a standard swinging on a transverse axis, a swinging load support also mounted to swing on a transverse axis to the rear of said support, a blade spring secured to the axis of said load support and extending forward over the axis of said standard and then upward into the path of said support as it swings forward to loaded position, and means swinging said standard forward.

11. In a device of the character described, the combination of a standard mounted to swing in a vertical plane, a swinging cable support mounted on said standard, a cable passing over said support, means for hauling in said cable to lift a load to be transported and to swing said standard to loaded position, and means automatically swinging said cable support during the swinging movement of said standard.

In testimony whereof I have signed this specification.

ROY C. HEATON.